No. 701,852. Patented June 10, 1902.
A. DAVIS.
ACETYLENE GAS GENERATOR.
(Application filed Jan. 31, 1898.)
(No Model.) 4 Sheets—Sheet 1.
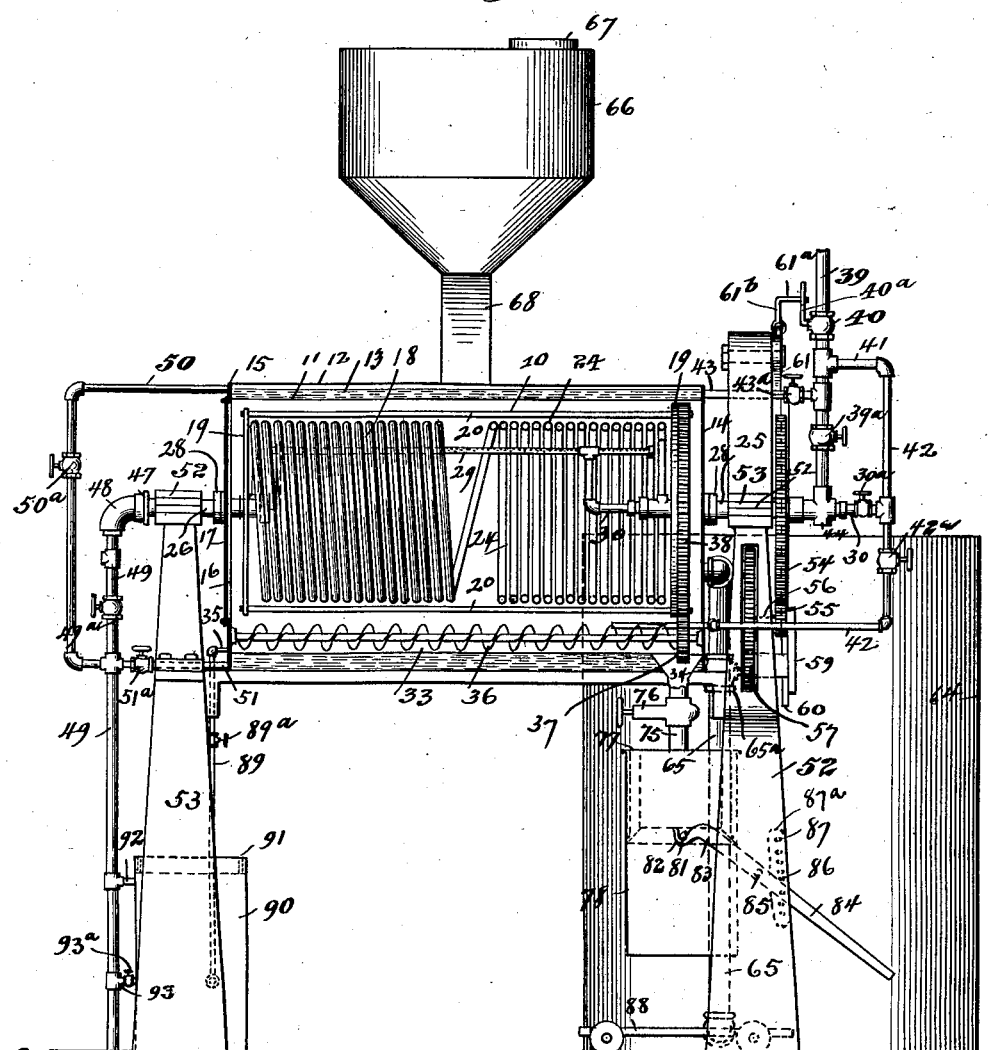

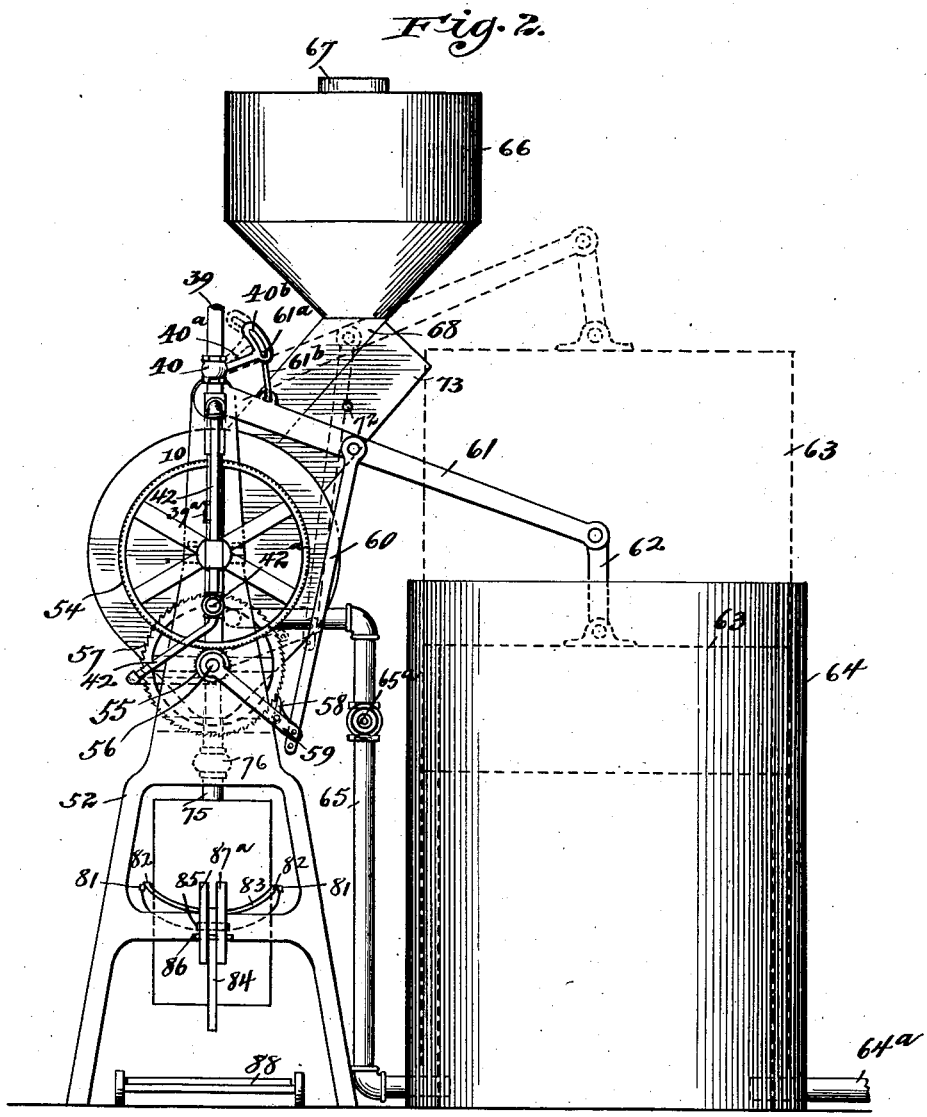

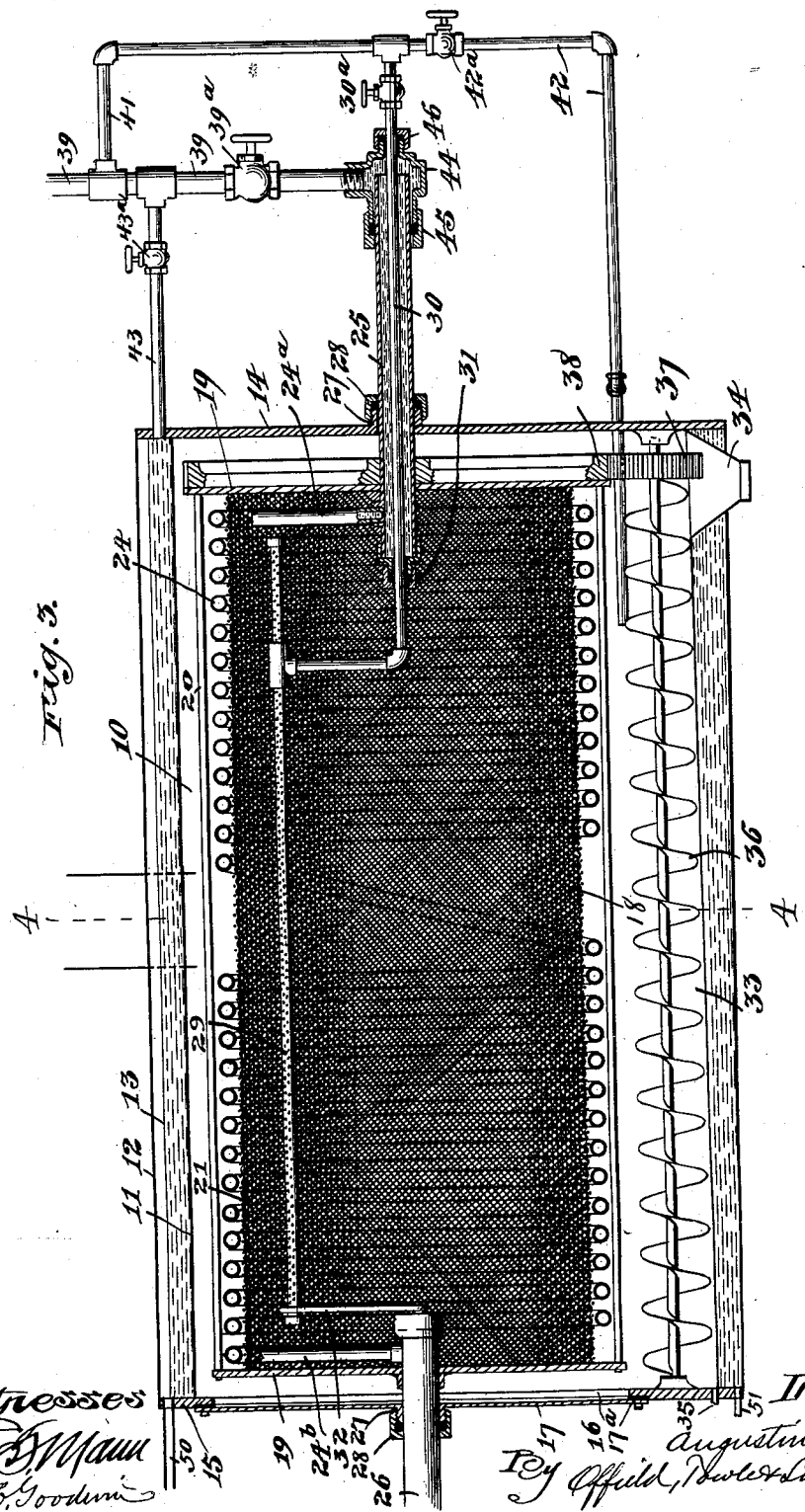

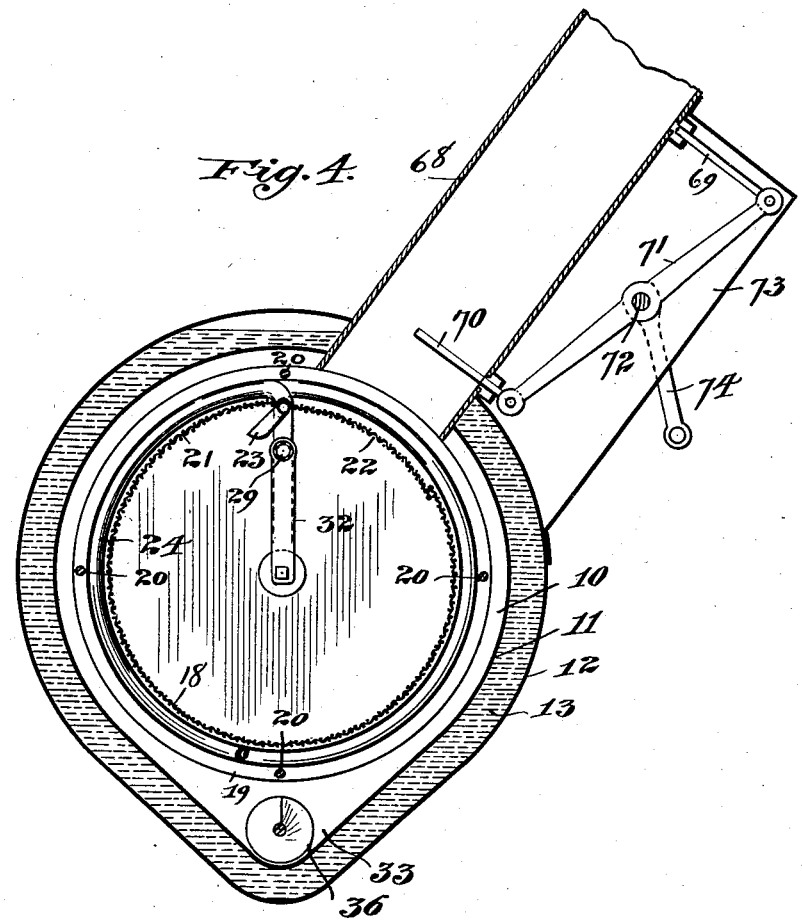

UNITED STATES PATENT OFFICE.

AUGUSTINE DAVIS, OF CHICAGO, ILLINOIS.

ACETYLENE-GAS GENERATOR.

SPECIFICATION forming part of Letters Patent No. 701,852, dated June 10, 1902.

Application filed January 31, 1898. Serial No. 668,571. (No model.)

*To all whom it may concern:*

Be it known that I, AUGUSTINE DAVIS, of Chicago, in the county of Cook and State of Illinois, have invented certain new and useful Improvements in Gas-Generators, of which the following is a specification.

This invention relates to gas-generators, and more particularly to that class in which gas is produced by the bringing into contact with each other of a solid, such as carbid of calcium, and a liquid, such as water.

The present invention has for its object to provide a generator of what is known as the "dry" type, employing an excess of carbid, which shall be automatic in its action, safe in operation, and by means of which the services of an attendant will only be required at comparatively long intervals, and then only for the purpose of recharging the apparatus and removing the sludge or spent material.

To these ends my invention consists in certain novel features which I will now proceed to describe and will then specifically point out in the claims.

In the accompanying drawings, Figure 1 is an elevation, partly in vertical section, of an apparatus embodying my invention, the cylindrical screen being omitted. Fig. 2 is an end elevation of the same. Fig. 3 is a vertical sectional view, on an enlarged scale, through the generator chamber and cylinder. Fig. 4 is a transverse sectional view of the same, taken on the line 4 4 of Fig. 3, the parts being shown in such a position that the feed-opening of the cylinder registers with the feed-chute; and Fig. 5 is an enlarged detail sectional view of a portion of the sludge-receptacle and its cover.

In the said drawings, 10 represents the generator-chamber, which is preferably approximately cylindrical in shape, having its longitudinal axis horizontally arranged. This chamber is provided with double outer walls 11 and 12, forming between them a space 13 to form a water-jacket, and is closed at its ends by means of heads 14 and 15, one of which—as, for instance, the head 15—is provided with an opening 16, adapted to be closed by a closure or cover 17, which latter is removable and is provided with a packing 17$^a$ in order to make a gas-tight joint when the cover is secured in place. Within the generator-chamber 10 is located a revoluble cylinder 18, adapted to contain the carbid or other solid and having a foraminous body to retain the carbid and permit the passage of the gas, water, and the sludge and finer particles of dust. In its preferred form, which is that shown in the drawings, this cylinder comprises terminal heads 19, which may be disk-shaped, as shown, and which are connected by longitudinal rods 20 and a cylindrical body 21, intermediate said heads, and composed of wire-netting or other suitable foraminous material.

For the purpose of giving access to the interior of the cylinder the body 21 is provided with a hinged section or door 22, which is normally held closed by a weight 23 or a spring or other equivalent device. Surrounding the foraminous body 21 is a hollow coil 24 of pipe, which spirally surrounds and supports said body, said coil being suitably spaced at the point where the door 22 is located to permit free access to the interior of the cylinder. The cylinder 18 is mounted upon hollow axes or tubular journals 25 and 26, upon which its terminal heads 19 are respectively secured and with which the ends 24$^a$ and 24$^b$ of the coil 24 are respectively connected. These hollow journals or axes, which are in the form of pipes closed at their inner ends within the cylinder, extend outward through suitable bearings 27 in the ends of the generator-chamber, said bearings being provided with stuffing-boxes 28 to prevent the escape of gas.

Within the cylinder 18 there is located, in the upper part thereof, a longitudinally-extending perforated pipe or sprinkler 29, which is stationary therein and to which water is supplied by a stationary pipe 30, which extends longitudinally through the hollow shaft 25 and through the closed inner end thereof, which is provided with a stuffing-box 31 to prevent leakage of gas or water. The pipe 30 is bent upward and connected to the sprinkler-pipe 29, which it supports at one end, the other end being supported by an arm 32 on the end of the shaft 26.

The wall of the generator-chamber is depressed at its lower portion below the revolving cylinder to form a trough or receptacle 33 to receive the sludge or debris, and this trough or receptacle is preferably slightly inclined, as shown in Fig. 3, from end to end of the chamber, being provided at its upper end with a discharge-outlet 34 for the sludge and at its lower end with a discharge-outlet 35 for the water. 36 indicates a screw conveyer located within the trough or receptacle 33 and adapted when rotated to feed the sludge and other materials toward the discharge-opening 34 and actuated by means of a pinion 37 on its shaft, which meshes with a gear 38, secured to one of the heads 19 of the revolving cylinder 18.

The water-supply for the entire apparatus is provided from any suitable source by means of a supply-pipe 39, controlled by a valve 40 in the manner hereinafter set forth. The pipe 39 is provided with a branch pipe 41, to which the sprinkler supply-pipe 30 is connected, as shown in detail in Fig. 3 of the drawings, said pipe 30 being provided with a controlling-valve 30$^a$, by means of which the supply to the sprinkler may be independently controlled. The pipe 41 is also connected with a pipe 42, which extends into the generator-chamber and discharges into the upper portion of the trough 33, said pipe 42 being also provided with a controlling-valve 42$^a$, by means of which the supply of water through said pipe 42 may be independently controlled. A branch pipe 43, provided with a valve 43$^a$, by means of which it may be independently controlled, leads to the water-jacket space 13. The pipe 39 terminates in a fitting 44, into which the outer end of the hollow shaft or pipe 25 extends through a suitable stuffing-box 45, the sprinkler supply-pipe 30 also extending through a suitable stuffing-box 46 at the opposite end of said fitting. The pipe 39 is provided with a controlling-valve 39$^a$, by means of which the supply of water to the coil 24 may be independently controlled. The waste water from the coil 24 passes out through the hollow shaft 26, which is connected at its outer end by means of a stuffing-box 47 and fixed fitting 48 to a waste-pipe 49, provided with a controlling-valve 49$^a$. 50 indicates a waste-pipe extending from the upper part of the water-jacket space 13 to a connection with the waste-pipe 49 and provided with a controlling-valve 50$^a$. 51 represents a drain-pipe provided with a controlling-valve 51$^a$ and extending from the lower portion of the water-jacket space 13 to the waste-pipe 49 to permit the draining of said water-jacket space when desired.

I prefer to provide a mechanism for automatically imparting a rotary movement to the cylinder 18, and to this end I secure upon the axis of said cylinder, which is mounted in suitable bearings 52 on supports 53, a gear-wheel 54, with which meshes a pinion 55, secured on a shaft 56, on which is also secured a ratchet-wheel 57, with which latter engages a spring-pawl 58, mounted on a lever 59, which is loosely mounted on the shaft 56.

Vibratory motion is imparted to this ratchet-lever by a connecting-rod 60, adjustably connected thereto at its lower end, while its upper end is connected to a lever-arm 61, pivoted at one end on one of the uprights 53, its other end being connected by means of a link 62 to the bell or piston 63 of a gas-motor or gas-holder 64, which is connected with the generator-chamber 10 by means of a pipe 65, provided with a controlling-valve 65$^a$.

The water-supply-controlling valve 40 is connected with and operated from the lever 61, said valve being provided with an arm 40$^a$, having in its end a slot 40$^b$, with which engages a pin 61$^a$ of an arm 61$^b$, pivotally connected to the lever 61.

The carbid or other material may be supplied to the interior of the cylinder 18 in any suitable manner, and in the present instance I have shown as constituting such a provision a hopper 66, provided with a closure 67 and having an inclined feed-chute 68, extending through the walls of the generator-chamber and terminating therein at a point so located that the cylinder may be so turned as to bring the door 22 opposite the end of said feed-chute. 69 and 70 indicate gates or valves extending through slots or openings in the bottom of the feed-chute and pivoted to the ends of an oscillating frame 71, mounted on a rock-shaft 72, inclosed within a casing 73 and adapted to be operated from the exterior thereof by a handle 74.

The sludge-discharge opening 34 communicates with a discharge-pipe 75, provided with a controlling-valve 76, said pipe having secured to it the cover 77 of a sludge-receptacle 78, which has an annular water-space 79 around its upper edge, into which a depending annular flange 80 of the cover 77 extends to form a water seal. The receptacle 78 may be lowered to disengage and remove the same, and for this purpose I support the same by means of lateral pins 81 in the notched arms 82 of the yoke 83 of a lever 84, pivoted at 85 on the support 53. This lever may be locked in position to hold the receptacle 78 in the raised position shown by means of a pin 86, passing through suitable apertures 87 in the uprights 87$^a$, and by removing said pin said yoke-lever may be raised to lower the receptacle 78 upon a suitable trolley or car 88, by means of which the receptacle may be readily transported to a suitable point of discharge.

The water-waste outlet 35 of the generator-chamber connects with a waste-pipe 89, provided with a controlling-valve 89$^a$, said waste-pipe opening at a point below the top thereof into a liquid-receptacle 90, provided with a water-sealed cover 91 and connected near its top by an overflow-pipe 92 with the waste-pipe 49. 93 indicates a drain-pipe for the liquid-receptacle 90, said drain-pipe being provided with a controlling-valve 93$^a$.

The apparatus thus constructed operates in the following manner: The cylinder having been rotated until the door 22 thereof comes opposite the mouth of the feed-chute 68 and the reservoir 66 being filled with the carbid of calcium or other solid material employed the same is fed into the interior of the cylinder by operating the lever 74 by hand, so as to withdraw the gate or valve 70 and advance the gate or valve 69, thereby permitting an amount of material sufficient in quantity to occupy the space between the two gates or valves to be discharged into the cylinder at each operation of the lever 74, the door 22 yielding to permit the passage of the material in an obvious manner. In this way the exact amount of material charged into the cylinder may be readily determined. The cylinder may then be rotated by hand to an extent sufficient to distribute the material along the length thereof. The valve 40 may then be opened by hand, the arm 61$^b$ being disconnected for this purpose, and water will then enter through the pipes 41 and 30 and, filling the perforated pipe or sprinkler 29, will be discharged upon the carbid within the cylinder and by its contact therewith will generate gas. At the same time, the valve 40 being opened, water will flow through the pipes 39 and 25 to the coil 24 and through this latter, and thereby serve to lower or reduce the temperature and prevent the excessive increase therein, which would otherwise result from the generation of the gas. At the same time water passes through the pipe 43 into the water-jacket space 13, from which it is discharged through the pipe 50 and serves by its presence to further reduce the temperature of the generator-chamber and the gas contained therein and prevent too great heating thereof. As the gas is generated within the generator-chamber it passes out through the pipe 65 to the holder 64 and causes the bell or piston 63 thereof to rise. The arm 61$^b$, having been again connected to the arm 40$^a$ of the water-supply-controlling valve 40 by inserting the pin 61$^a$ thereof in the slot 40$^b$, when the bell of the generator has risen to the proper height, as indicated in dotted lines in Fig. 2, the pin 61$^a$ will come into contact with the upper end of the slot 40$^b$ and upon continued upward movement of the bell or piston 63 will by such engagement close the valve 40. This closing of the valve 40 shuts off the water-supply to the sprinkler-pipe, and consequently arrests the generation of gas, and at the same time the supply of water to the cooling-coil 24 and water-jacket space 13 is cut off. During this upward motion of the bell or piston 63 the lever-arm 61 by means of the connecting-rod 60 has imparted an upward movement to the ratchet-lever 59, the spring-pawl 58 of which engages the ratchet-wheel 57 and rotates the same, and consequently rotates the shaft 56 and pinion 55, which latter through the medium of the gear-wheel 54 imparts a slow movement of rotation to the cylinder 18. The rotation of the cylinder 18 imparts, through the gear 38 and pinion 37, a more rapid rotary motion to the spiral conveyer 36 within the trough 33. When the bell or piston 63 has reached the upper limit of its motion and has thereby closed the water-controlling valve 40, this rotary motion of the cylinder and conveyer ceases along with the cessation of the generation of gas.

The gas-holder 64 may be the storage-holder of the illuminating system supplied by the apparatus, in which case the outlet-pipe 64$^a$ of said holder may be connected, either directly or through a suitable purifier, to the service-pipe of the system. I may, however, employ a separate storage-holder, to which the pipe 64$^a$ is connected, in which case the holder 64, with its bell, operates only as a motor for controlling the generation of gas. In either case upon a decrease in the amount of gas in the holder, due to consumption thereof or to other causes, the bell 63 will be lowered, and when in its descent said bell has reached a point where the pin 61$^a$ engages the lower edge of the slot 40$^b$ the further descent of the bell opens the water-controlling valve 40, and the generation of gas proceeds as before until sufficient gas has been generated to again raise the bell and cut off the water-supply.

It will be seen that the machine is automatic in its action, generating gas as the same is needed, and that the water-supply is so controlled that during the generation of gas and the consequent evolution of heat water is passed through the coil 24, which forms a part of the cylinder, and through the water-jacket which surrounds the cylinder, and thereby prevents too high a temperature being attained therein. As soon as the generation of gas ceases the supply of water to the cooling devices is at once cut off, and waste of water is thereby prevented, the cooling fluid being used only when needed.

Water is supplied to the carbid in comparatively small quantities, so that there is always an excess of the carbid present, thus insuring complete absorption of the water and producing a dry gas. As, however, that portion of the carbid with which the water comes in contact becomes exhausted and forms a powder which is inert so far as the generation of gas is concerned, it is desirable to remove this inert powder, so as to permit the water to have direct access to the unconsumed carbid, and this is accomplished by the rotation of the cylinder, which permits the spent carbid in its powdered form to pass through the meshes or openings of the foraminous body of the cylinder and at the same time presents fresh bodies or surfaces of the carbid to the action of the water from the sprinkler. The location of the cooling-coil immediately surrounding the foraminous body of the cylinder and forming practically a part of the cylinder-wall serves not only to bring the cooling liquid into immediate juxtaposition with the point of generation of the greatest heat, where its cooling effect is most needed, but it also serves to strengthen and support the foraminous body of the cylinder and enable it to efficiently sustain its load of material.

The spent carbid falls into the trough 33, where it is formed into a paste or sludge, owing to the accumulation of moisture at this point, this action being assisted by the discharge of water from the pipe 42. In an apparatus of this character it may occur that small pieces of material not totally spent and gas-containing dust will drop into the trough 33 and be liable to pass off with the sludge without yielding their gas in the generator, while at the same time the residuum becomes impregnated therewith. To obviate this difficulty, I introduce water into said trough through the pipe 42, and this water, flowing down the inclined bottom thereof toward the discharge-outlet 35, comes into contact with and disintegrates any gas-containing particles of the residuum or sludge which may lie within said trough, so that all the gas is extracted therefrom within the generator-chamber. This supply of water is, however, relatively very small and is automatically controlled by the valve 40 in the same manner as the rest of the water-supply. The sludge or residuum is discharged through the opening 34, to which it is carried by means of the conveyer 36, while the water escapes through the outlet 35.

The sludge or residuum passes downward through the pipe 75, the valve 76 being opened, and is discharged into the receptacle 78, any escape of gas being prevented by the water-sealed top provided for said receptacle. When it is desired to remove the residuum, the valve 76 is closed and the pin 86 being withdrawn the lever 84 is operated to lower the receptacle 78 onto the trolley or car 88, by means of which it may be removed to any suitable point of discharge. The receptacle may then be replaced and the valve 76 opened, whereupon the residuum will be discharged into the receptacle, as before. The water from the interior of the generator-chamber passes through the outlet 35 to the pipe 89 and thence into the liquid-receptacle 90, which acts as a seal for the lower end of said pipe to prevent the escape of gas. In case of the accumulation of any residuum or sludge in the receptacle 90 the valve $89^a$ may be closed and the water-sealed cover 91 of said receptacle removed to permit access to the interior of said receptacle for the purpose of removing said residuum.

In practice I have found that the residuum produced by the bringing into contact with each other of carbid of calcium and water tends to form ammonia and ammoniacal gases and other similar compounds, and this is particularly the case where the residuum is inclosed and contained within the generator-chamber, where it is prevented from having free contact with the air and is also subjected to the changing temperatures and conditions and the presence of the nascent gases which exist there. The ammonia and other compounds thus produced will, if the residuum be permitted to remain within the generator-chamber, materially affect the quality of the gas produced, and thereby destroy the efficiency of the apparatus. For these reasons I deem the provision of automatic mechanism for promptly and efficiently removing the residuum from the generator-chamber of material importance to the success of the practical operation of the apparatus, and therefore have made the provisions to that end hereinbefore described.

If for any reason it be desired to remove the cylinder from the generator-chamber, this removal may be accomplished by taking off the closure 17, the opening 16 at the end of the generator-chamber being of sufficient size to permit the removal bodily of the entire cylinder, which may be of course readily replaced.

I do not wish to be understood as limiting myself to the precise details of construction hereinbefore set forth. For instance, although I have described the part 18 as a cylinder it is obvious that it may have a form other than circular in cross-section. The various structural details and specific embodiments of mechanisms may also obviously be varied without departing from the principle of my invention, and I therefore do not wish to be understood as restricting myself to the precise construction shown and described.

I claim—

1. In a gas-generator, the combination, with a generator-chamber, of a cylinder revolubly supported therein at both ends, provided with a foraminous body and a hollow axis and adapted to contain the carbid or other solid, a fixed or stationary perforated pipe or sprinkler located within the upper portion of the cylinder, and a water-supply pipe connected thereto and extending through the hollow axis of the cylinder to the exterior of the chamber, substantially as described.

2. In a gas-generator, the combination, with a generator-chamber, of a revoluble cylinder therein adapted to contain the carbid or other solid, and having a foraminous body, and a coil of pipe externally surrounding said body, connected to suitable water supply and discharge pipes and supporting and rotating along with the foraminous body, substantially as described.

3. In a gas-generator, the combination, with a generator-chamber, of a revoluble cylinder therein adapted to contain the carbid or other solid and comprising terminal heads and connecting-rods, a foraminous body of wire-netting or the like, and a coil of pipe surrounding and rotating along with said foraminous body and having suitable supply and discharge connections for a cooling medium such as water, substantially as described.

4. In a gas-generator, the combination, with a generator-chamber provided with a water-jacket, of a revoluble carbid-cylinder within said chamber provided with a surrounding cooling-coil, means for supplying water to the carbid in the cylinder, and means for simultaneously supplying water to the water-jacket and cooling-coil, substantially as described.

5. In a gas-generator, the combination, with a generator-chamber to contain the carbid or other solid and cooling devices for said generator-chamber, of means controlled by the volume of gas generated for simultaneously supplying water to the carbid and to the cooling devices, substantially as described.

6. In a gas-generator, the combination, with a generator-chamber, of a revoluble carbid-cylinder therein having a foraminous body, an inclined trough or receptacle in said chamber below said cylinder, a conveyer located in said trough or receptacle, a residuum-discharge opening at the upper end of said trough or receptacle, and a water-discharge opening at the lower end thereof, substantially as described.

7. In a gas-generator, the combination, with a generator-chamber, of a revoluble carbid-cylinder therein having a foraminous body, an inclined trough or receptacle in said chamber below said cylinder, a conveyer located in said trough or receptacle, a residuum-discharge opening at the upper end of said trough or receptacle, a water-discharge opening at the lower end thereof, and a water-supply pipe discharging into the upper end of said trough or receptacle, substantially as described.

8. In a generator of the character described, the combination, with a generator-chamber having a residuum-discharge pipe provided with a cover having a depending annular flange, of a residuum-receptacle provided with an annular water seal to receive said flange, and means for raising and lowering and supporting in a raised position said receptacle, substantially as described.

9. In a gas-generator of the character described, the combination, with a generator-chamber having a residuum-discharge pipe provided with a cover having a depending annular flange, of a residuum-receptacle provided with an annular water seal to receive said flange, and a lever provided with a yoke to engage said receptacle and with means whereby said lever may be locked, substantially as described.

10. In a gas-generator of the character described, the combination, with a generator-chamber having an inclined bottom, a conveyer therein, and a water-supply pipe, of a water-discharge pipe, and a liquid-receptacle into which said discharge-pipe opens below the water-level, said liquid-receptacle being connected to a suitable discharge-pipe and provided with a water-sealed cover, substantially as described.

AUGUSTINE DAVIS.

Witnesses:
FREDERICK C. GOODWIN,
IRVINE MILLER.